Sept. 2, 1969   L. A. MEYER   3,464,678
CHANGING FLAMMABLE LIQUID VOLATILE FUELS INTO FLAMMABLE GASES
Filed April 29, 1965   2 Sheets-Sheet 1

INVENTOR.
Louis Allen Meyer

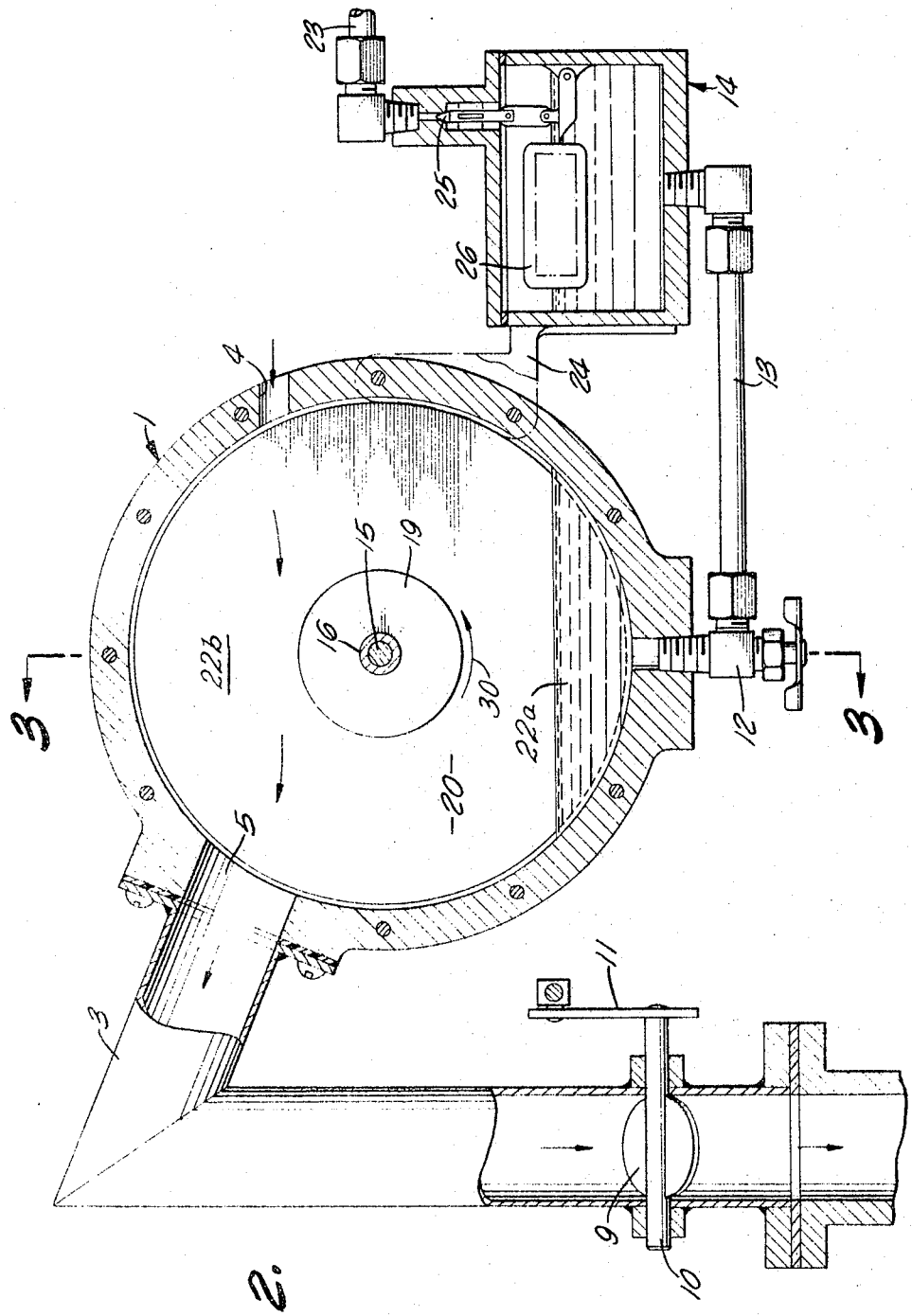

United States Patent Office 3,464,678
Patented Sept. 2, 1969

3,464,678
CHANGING FLAMMABLE LIQUID VOLATILE
FUELS INTO FLAMMABLE GASES
Lorin Allen Meyer, 2640 Ave. Thirty-one W.,
Los Angeles, Calif. 90065
Filed Apr. 29, 1965, Ser. No. 451,930
Int. Cl. F02m 17/00
U.S. Cl. 261—60                                    3 Claims

ABSTRACT OF THE DISCLOSURE

An apparatus for changing certain volatile liquids into a combustible gaseous state for use in engines and turbines of the type using volatile hydrocarbons for fuel. An assembly of circular, spaced apart thin plates is rotated at predetermined speeds with the outer peripheral region of each plate being immersed in the volatile liquid. Air inlet and gaseous mixture outlet ports are provided, the air entering the apparatus and passing between the wetted plates as they rotate with the result that vapors of the volatile liquid are mixed with the incoming air to form a combustible gaseous mixture. Operational control of the apparatus is achieved by varying the speed of the rotating plate assembly and by opening or closing a butterfly-type valve in the outlet passageway to increase or decrease the rate of mixture flow.

---

This invention relates to apparatus that takes flammable volatile liquids and changes them into flammable gases which can be used for lighting, heating and power purposes, such as in engines and turbines of the type using volatile hydrocarbons for fuel, such as, gasoline, kerosine and benzine.

It is an object of the invention to provide an improved apparatus for converting volatile liquids of the combustible type into a similarly combustible mixture for use on internal combustion engines and turbines.

It is another object of the invention to provide an apparatus of the type described that is compact and has a minimum number of parts, is inexpensive in its manufacture and maintenance, and requires a minimum amount of power to operate and control.

It is still another object of the invention to provide an apparatus of the type described that presents minimum obstruction to the passage of the combustible fuel/air mixture to the engine or turbine.

Other objects, features and advantages of the invention will appear and be brought out more fully in the following specification.

A brief description of the views of the drawings of the invention is as follows:

FIGURE 2 is a longitudinal cross-sectional view of the preferred embodiment taken on the line 2—2 of FIGURE 1.

Figure 1:
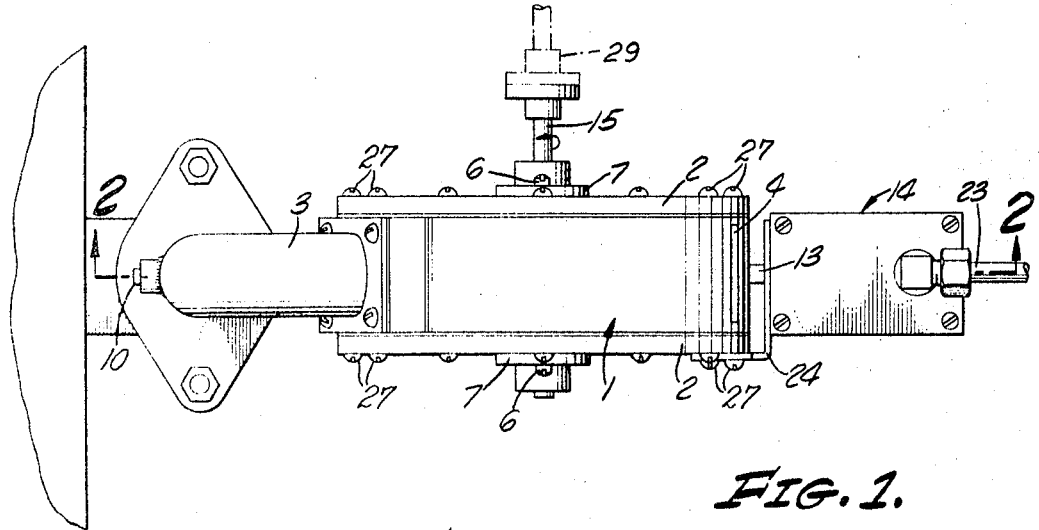
FIGURE 1 is a plan view of one embodiment of a device according to the invention.

In carrying out the invention, a preferred embodiment includes housing 1, which acts both as a liquid fuel reservoir 22a and as a gaseous mixing chamber 22b having removable side walls 2, for permitting access to the interior of the housing 1 when desired. For reasons to be described, the side walls 2 are parallel to each other and secured to the housing 1 by conventional threaded fasteners 27.

Figure 3:
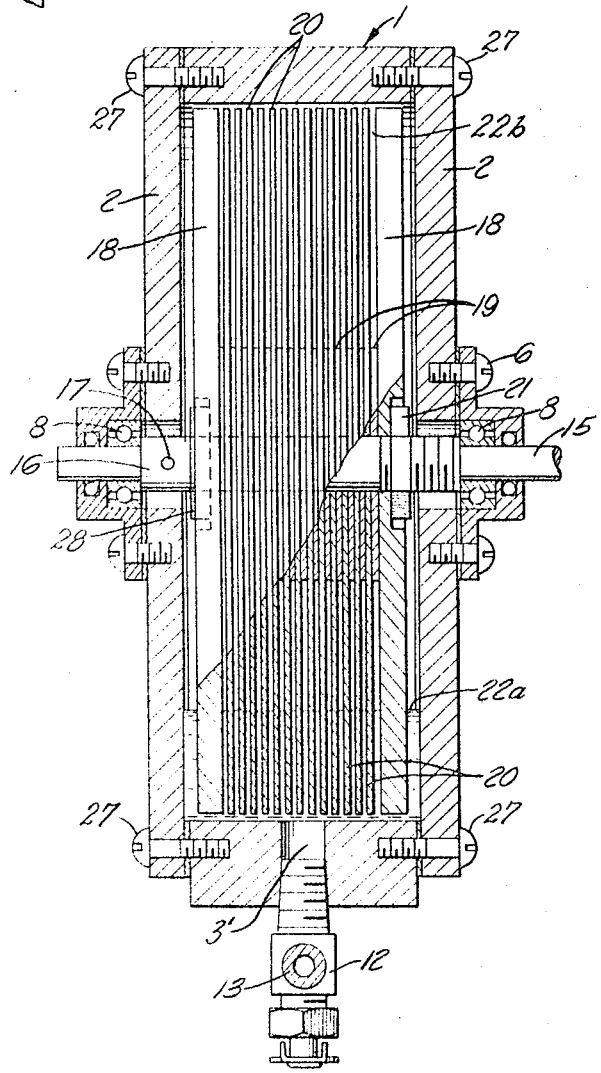
FIGURE 3 is a vertical cross-sectional view of the preferred embodiment taken on the line 3—3 of FIGURE 2.

The housing 1, which may be cylindrical in configuration as illustrated in FIGURE 2, is provided with three holes or ports 3', 4 and 5. The hole 3' at the bottom of the housing 1, as seen in FIGURES 2 and 3, is radially disposed and threaded to receive a conventional shutoff valve 12. The hole or port 4 in the side of the housing 1 serves as an air inlet or air intake port 4. The third hole or port 5 in the side of the housing 1, substantially opposite the air intake port 4 is the gaseous accumulating port, a mixture outlet port 5. Ports 4 and 5 are located above the shaft 15, sleeve 16 and the liquid fuel in the reservoir 22a as clearly shown in FIGURE 2.

As the drawings show, the bottom or lower portion of the generator housing 1, is the liquid fuel reservoir 22a and the upper portion of the generator housing 1, between the intake port 4, and the gaseous accumulating port 5, is the generator mixing chamber.

The location and size of the air intake port 4 and the gaseous accumulating port 5 are very important. More specifically, the ports 4 and 5 are arranged in the generator housing 1 so that the fast moving stream of air passing between the ports 4 and 5 is sufficiently above the liquid fuel in the reservoir 22 when the generator is in operation.

Stated differently, if the ports 4 and 5 are located too low or are too small in size, the fast traveling air through the intake port 4, across the upper portion of the housing 1 to the gaseous accumulating port 5, would cause the liquid fuel in the reservoir 22a to churn or act as if the liquid fuel were boiling with the result that the liquid would be drawn up and into the gaseous accumulating port 5. The apparatus would then be operating as any other simple liquid fuel mixing device or carburetor.

The gas accumulating pipe 3 is mechanically coupled to the housing 1 with the gas accumulating port 5 in longitudinal alignment therewith, as shown in FIGURE 2.

The gas accumulating pipe 3 is also provided with a horizontal shaft 10, having a round disk 9 operatively mounted thereon to form a common butterfly valve.

The valve or disk 9 may be actuated by an arm 11 attached to the shaft 10 on the outside of the gas accumulating pipe 3 for purposes of controlling the amount of flow of gases from the apparatus or generator.

Below the butterfly valve, at the end of the gas accumulating pipe 3, there is provided a flange, reference FIGURE 1, for use in connecting the apparatus or generator to the intake manifold or induction port of any gaseous type pump, engine or apparatus that develops a suction or partial vacuum.

Inside the generator housing 1, as FIGURE 3 illustrates, is disposed a horizontal round shaft 15. The shaft 15 is journaled in bearings 8, which are held by bearing supports 7 secured to the generator sides by adjusting screws 6. The shaft 15 also extends through a sleeve 16, and is fastened to the sleeve 16 by a set screw 17. The sleeve 16 is round and has a collar 28 at one end and is threaded at the other end.

Placed on this sleeve 16, by using their center holes, is an assembly of thin circular plates 20, thin circular spacers 19 and circular sealing disks 18. The arrangement of the thin circular plates 20, the thin circular spacers 19 and the circular sealing disks 18 on the sleeve 16, as FIGURE 3 shows, is as follows:

The sealing disk 18 fits next to the collar 28 at the end of the sleeve 16. Next to the sealing disk 18 is placed a thin circular spacer 19. Next to the thin spacer 19 is placed a thin circular plate 20. This arrangement of thin circular plates 20, thin circular spacers 19 and thin circular plates 20 continues to the threaded portion of the sleeve 16. At this point, a thin circular spacer 19 is used to separate the last thin circular plate 20 from the other circular sealing disk 18, which in turn is next placed on the threaded shaft portion of shaft 16. Following the sealing disks 18, a lock nut 21 is provided to complete the assembly.

The assembly, a fixed unit of the shaft 15, is placed inside the housing 1, and side walls 2 are fastened to the housing 1 to form an air tight connection.

The sealing disks 18 are positioned as close as possible to the intake port 4 without touching the inside wall of the housing 1 by adjusting the screws 6.

To complete the invention, a chamber more accurately called a float chamber 14 is used, as illustrated in FIGURE 2. The liquid fuel is fed from a source of supply, not shown, to a float chamber 14, having a float 26 therein for the purpose of controlling the supply of fuel to the chamber 14. The supply of fuel being checked when the level of the fuel in said chamber 14 rises to a point where the flow of fuel into the chamber 14 through a pipe 23 is cut off by a valve 25 which is actuated by the float 26. Chamber 14 may be supported by a bracket in any suitable fashion, in the present instance being shown as supporter 24 mounted on the side walls 2 of the housing 1, reference FIGURE 2.

From the chamber 14, the fuel communicates through a pipe 13 to an opened valve 12, and then up through the valve 12 into the housing 1, in which the fuel will be maintained at a desired level corresponding to that in the float chamber 14, as will be readily understood.

As best seen in FIGURE 2, a portion of the assembly of thin circular plates 20 and the sealing disks 18, fixed on the center shaft 15, are suspended in the liquid fuel. A suitable source of power, depicted by a reference numeral 29, is coupled to the shaft 15 to rotate the assembly of thin circular plates 20 and the sealing disks 18 in the direction of an arrow 30, as FIGURE 2 shows. The source of power 29 is adjustable so as to rotate the shaft 15, the thin circular plates 20 and the sealing disks 18 at desired variable speeds.

As power is applied to the shaft 15, the assembly of thin circular plates 20 and the sealing disks 18 rotates with the edges and a portion of their sides passing through the liquid fuel in the reservoir 22a.

The resulting thin coating of fuel on the edges and a portion of the sides of the thin circular plates 20 and the sealing disks 18 is carried up toward the intake port 4 by the rotating assembly.

It is to be noted that the narrow spaces between adjacent circular plates 20 and the inside walls of the sealing disks 18 form a group or plurality of mixing chambers in the upper portion of the housing 1.

The incoming air that enters the housing 1 through the intake port 4 is confined between the sealing disks 18 and restrained from passing between the outside surfaces of the sealing disks 18 and the inside surfaces of the side walls 2. The sealing disks 18 serve to keep the incoming air in a direct line from the intake port 4 through the mixing chamber assembly, the thin circular plates 20 and the inner surface of the sealing disks 18, to the gaseous accumulating port 5 on the other side of the housing 1.

As the assembly of thin circular plates 20 and sealing disks 18 are rotating with their edges and a portion of their sides covered with a thin coating of fuel, the butterfly valve 9 in the gaseous accumulating pipe 3 is opened and a suction is created in the gaseous accumulating pipe 3 which in turn creates a suction in the housing 1. This in turn causes air to enter the housing 1 through the intake port 4. The incoming air then passes between the many thin circular plates 20 and the inside walls of the sealing disks 18 and mixes with the vapors of the liquid coating after which the mixture exits at the gas accumulating port 5 and then passes through the gas accumulating pipe 3 down to whatever device the apparatus according to the invention is operatively mounted.

As the fast-moving stream of air passes between the rotating, circular plates 20 and the insides of the fuel coated sealing disks 18 the fuel is virtually pulled from the edges and sides of the thin circular plates 20. The fast-moving air also pulls the fuel across the dry upper portion of the thin circular plates 20 as well as the dry upper portion of the inside surfaces of the sealing disks 18 towards the gaseous accumulating port 5.

The further the clinging liquid fuel is dragged or pulled across the dry portion of the side surfaces of the thin circular plates 20 and the dry portion of the inside surfaces of the sealing disks 18, the thinner the coating of liquid fuel becomes, and the more readily the clinging fuel evaporates into, or mixes, with the passing air.

This means that the said liquid fuel does not leave the sides of the thin circular plates 20 or the inside walls of the sealing disks 18, before it is evaporated from the same.

The resultant flammable gas then passes into the gaseous accumulating port 5 and travels through the gas accumulating pipe 3 to whatever device is the source of suction or partial vacuum in the housing 1.

After the fast-moving stream of air evaporates the liquid fuel from the thin, smooth, circular plates 20 and the edges of the same, and also from the inside surfaces of the circular sealing disks 18, the plates 20 and the disks 18 are rotated back through or into the liquid fuel held in the fuel reservoir 22a, making a complete cycle, as is readily understood.

The apparatus is capable of continually making a flammable gas as long as there is a volatile flammable liquid fuel in the fuel reservoir 22a, and the rotating assembly of thin plates 20 and sealing disks 18 carry the volatile fuel up into the fast moving stream of air passing through the intake port 4 to the gaseous accumulating port 5.

Having thus described my invention, what I claim and desire to secure by Letters Patent is:

1. An apparatus for changing inflammable volatile liquids into a gaseous state comprising in combination,
   housing means having a ring-like cross-sectional configuration;
   side walls disposed in parallel alignment on said housing means at opposite ends thereof, the interior of said housing means and said side walls forming a cylindrical chamber having a region for mixing predetermined amounts of said liquid with the atmosphere in the upper portion thereof and a reservoir for said liquid in the lower region thereof;
   input port means including an air inlet opening disposed in said housing means intermediate said side walls in a first upper guadrant of said housing means and extending into said chamber at the upper portions thereof;
   output port means including a gaseous mixture outlet opening disposed in said housing means intermediate said side walls in the upper guadrant of said housing means adjoining said first quadrant and extending into said chamber at the upper portion thereof;
   means for supplying said flammable volatile liquid to said reservoir and including a threaded opening disposed radially in said housing means near the lowest point thereof, an adjustable valve operably disposed in said threaded opening, and float valve means for supplying said flammable volatile liquid through said valve to a predetermined depth within said reservoir;
   bearing supports including a bearing centrally mounted on each side of said side walls at the exterior thereof, said side walls further including centered openings disposed in axial alignment with said bearing supports;
   rotating means including a shaft mounted on said bearing supports, said shaft extending a predetermined distance in opposite directions through said centered openings;
   cricular sealing disks mounted on said shaft near the inner surface of each of said side walls and extending into said liquid in said reservoir;
   an assembly of circular plates and spacers alternately arranged on said shaft between said sealing disks, said circular plates having a diameter equal to that of said sealing disks and a thin-thickness relative to that of said sealing disks, said circular spacers having a small diameter relative to the diameter of said circular plates; and means coupled at one end of said shaft for rotating said shaft for rotating said sealing disks and said assembly at a predetermined speed, said input port means and said output port means are located above the shaft and the liquid fuel in the reservoir to allow air entering the inlet opening to pass between said rotating circular plates and to mix with the vapors of said liquid coating the rotating circular plates prior to passing through said output port means.

2. The apparatus in accordance with claim 1 further characterized in that there is provided a gas accumulating pipe means coupled to said outlet port means and a control means for controlling the rate at which the gaseous mixture passes through said output port means and said pipe means including a movable butterfly valve transversely disposed therein.

3. The apparatus in accordance with claim 2 further characterized in that said rotating means further includes power means for driving said shaft at predetermined variable speeds.

References Cited

UNITED STATES PATENTS

| | | | |
|---|---|---|---|
| 1,976,228 | 10/1934 | Hutzel | 261—92 |
| 2,145,374 | 1/1939 | Salerni | 261—92 |
| 2,246,876 | 6/1941 | Carver | 261—92 |
| 2,723,841 | 11/1955 | Adams | 261—92 X |

RONALD R. WEAVER, Primary Examiner

U.S. Cl. X.R.

261—68, 92